US010327190B2

(12) United States Patent
Macwan et al.

(10) Patent No.: US 10,327,190 B2
(45) Date of Patent: Jun. 18, 2019

(54) INTERNET PROTOCOL SESSION PERSISTENCE FOR MOBILE COMMUNICATIONS

(71) Applicant: AT&T Intellectual Property I, L.P., Atlanta, GA (US)

(72) Inventors: Sanjay Macwan, Marlboro, NJ (US); Azfar Inayatullah, Princeton Junction, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1128 days.

(21) Appl. No.: 14/660,313

(22) Filed: Mar. 17, 2015

(65) Prior Publication Data
US 2015/0257076 A1    Sep. 10, 2015

Related U.S. Application Data

(62) Division of application No. 13/305,492, filed on Nov. 28, 2011, now Pat. No. 9,014,085.

(51) Int. Cl.
*H04W 36/32* (2009.01)
*H04W 4/00* (2018.01)
(Continued)

(52) U.S. Cl.
CPC ............ *H04W 36/32* (2013.01); *H04W 4/00* (2013.01); *H04W 4/029* (2018.02); *H04W 36/30* (2013.01);
(Continued)

(58) Field of Classification Search
CPC ..... H04W 36/16; H04W 36/18; H04W 36/22; H04W 36/24; H04W 36/38; H04W 48/04;
(Continued)

(56) References Cited

U.S. PATENT DOCUMENTS 6,351,642 B1 * 2/2002 Corbett ................. H04W 36/32
455/440
6,426,960 B2 7/2002 Antonio
(Continued)

OTHER PUBLICATIONS

Office Action dated Jan. 9, 2014 for U.S. Appl. No. 13/305,492, 24 pages.
(Continued)

*Primary Examiner* — Christine Ng
(74) *Attorney, Agent, or Firm* — Amin, Turocy & Watson, LLP

(57) ABSTRACT

Providing for mobile communications incorporating Internet Protocol (IP) persistence is described herein. By way of example, IP persistence can be implemented for a mobile device receiving IP data content over a mobile network. Particularly, if the mobile device encounters a region of poor wireless coverage, the IP data content can be transmitted to the mobile device over a plurality of base stations concurrently. Thus, the IP persistence can comprise duplicating the IP data content and transmitting separate independent wireless transmissions of the content to the mobile device from separate cells or separate transmitters. The duplicate transmitting can be continued while the mobile device is within the region of poor wireless coverage, until a suitable quality of service or quality of experience parameter is met for a serving network, or the like.

20 Claims, 13 Drawing Sheets

(51) Int. Cl.
*H04W 36/30* (2009.01)
*H04W 48/16* (2009.01)
*H04W 4/029* (2018.01)
*H04W 36/38* (2009.01)
*H04W 88/08* (2009.01)

(52) U.S. Cl.
CPC ............ *H04W 48/16* (2013.01); *H04W 36/38* (2013.01); *H04W 88/08* (2013.01)

(58) Field of Classification Search
CPC ..... H04W 36/32; H04W 4/029; H04W 48/16; H04W 36/30; H04W 4/00; H04W 88/08
See application file for complete search history.

(56) References Cited

U.S. PATENT DOCUMENTS

| | | | | |
|---|---|---|---|---|
| 7,002,936 | B2* | 2/2006 | Agrawal | H04L 29/12018 370/329 |
| 7,496,060 | B2* | 2/2009 | Ramirez | H04W 88/06 370/311 |
| 7,542,456 | B2 | 6/2009 | Garg et al. | |
| 7,545,780 | B2 | 6/2009 | Chitrapu | |
| 8,121,607 | B2* | 2/2012 | Fang | H04W 36/22 370/331 |
| 8,725,544 | B2 | 5/2014 | Vahidi et al. | |
| 2001/0044322 | A1 | 11/2001 | Raaf | |
| 2002/0141360 | A1* | 10/2002 | Baba | H04W 36/0011 370/331 |
| 2002/0191558 | A1* | 12/2002 | Agrawal | H04L 29/12018 370/329 |
| 2006/0209882 | A1 | 9/2006 | Han et al. | |
| 2006/0211418 | A1* | 9/2006 | Hofmann | H04W 36/32 455/426.1 |
| 2007/0189261 | A1* | 8/2007 | Choi | H04W 36/18 370/347 |
| 2007/0240209 | A1 | 10/2007 | Lewis et al. | |
| 2008/0102813 | A1 | 5/2008 | Chari et al. | |
| 2009/0156227 | A1 | 6/2009 | Frerking et al. | |
| 2010/0067434 | A1 | 3/2010 | Siu et al. | |
| 2010/0105394 | A1* | 4/2010 | Cheng | H04W 36/32 455/440 |
| 2010/0128698 | A1* | 5/2010 | Ishizu | H04W 48/20 370/332 |
| 2010/0219689 | A1 | 9/2010 | Evertz | |
| 2010/0260068 | A1 | 10/2010 | Bhatt et al. | |
| 2010/0265874 | A1* | 10/2010 | Palanki | H04B 7/2606 370/315 |
| 2010/0296440 | A1 | 11/2010 | Pernu et al. | |
| 2011/0075557 | A1* | 3/2011 | Chowdhury | H04L 12/14 370/230 |
| 2011/0151864 | A1* | 6/2011 | Byun | H04W 36/30 455/426.1 |
| 2011/0185202 | A1 | 7/2011 | Black et al. | |
| 2012/0106516 | A1 | 5/2012 | Jung et al. | |
| 2013/0128738 | A1* | 5/2013 | Cohen | H04L 45/125 370/235 |

OTHER PUBLICATIONS

Office Action dated Aug. 25, 2014 for U.S. Appl. No. 13/305,492, 26 pages.

Notice of Allowance dated Dec. 18, 2014 for U.S. Appl. No. 13/305,492, 35 pages.

* cited by examiner

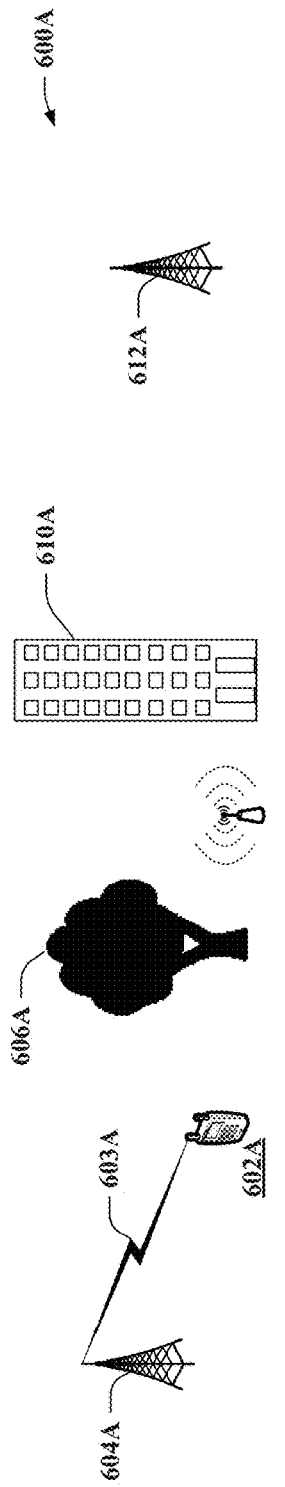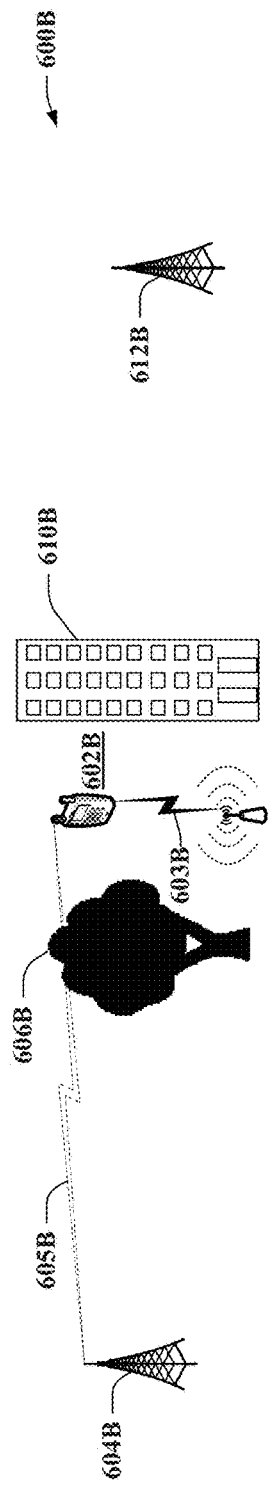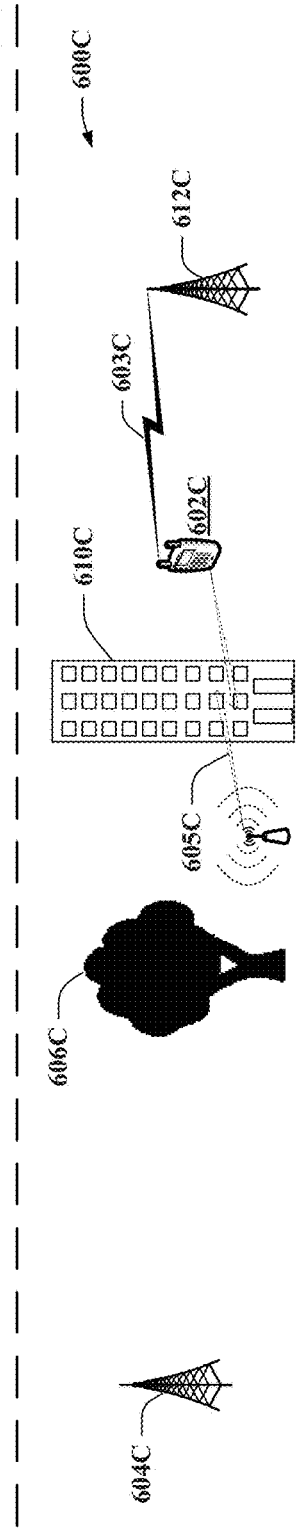

INTERNET PROTOCOL SESSION PERSISTENCE FOR MOBILE COMMUNICATIONS

CROSS-REFERENCE TO RELATED APPLICATIONS

This application for patent is a divisional application of, and claims priority to, U.S. patent application Ser. No. 13/305,492, entitled INTERNET PROTOCOL SESSION PERSISTENCE FOR MOBILE COMMUNICATIONS and filed Nov. 28, 2011, which application is hereby incorporated herein by reference in its entirety.

TECHNICAL FIELD

The subject disclosure relates to wireless communications, and more particularly to providing persistence for an Internet Protocol session established for mobile communications.

BACKGROUND

Mobile equipment networks provide real-time wireless communication services to subscriber communication terminals, through a planned deployment of radio access base stations. Base stations are carefully positioned throughout the deployment to provide seamless wireless coverage for a geographic area served by a mobile equipment network. Because gaps in base station coverage result in communication dead spots, or areas without wireless service, network operators tend to carefully test base station deployments to identify and correct gaps in wireless coverage.

Many causes of service outage exist, including static, mobile and even random causes. Common examples include physical structures, such as buildings, highways, bridges, and the like, and geographical contours such as steep valleys, hills, mountains, and so on. In many situations, dead spots can be addressed through installation of additional base stations, including micro or pico base stations, within areas receiving poor coverage from a macro network deployment. However, some causes of poor service can be transitory, or even random, and difficult to anticipate or correct. Accordingly, existing research and development efforts in mobile network technology are aimed at addressing problems in wireless coverage and improving call drops, dead zones, and the like.

BRIEF DESCRIPTION OF THE DRAWINGS

FIGS. 6A, 6B and 6C depict diagrams of an example mobile environment in which IP persistence can be implemented, according to additional aspects.

DETAILED DESCRIPTION

Figure 1:
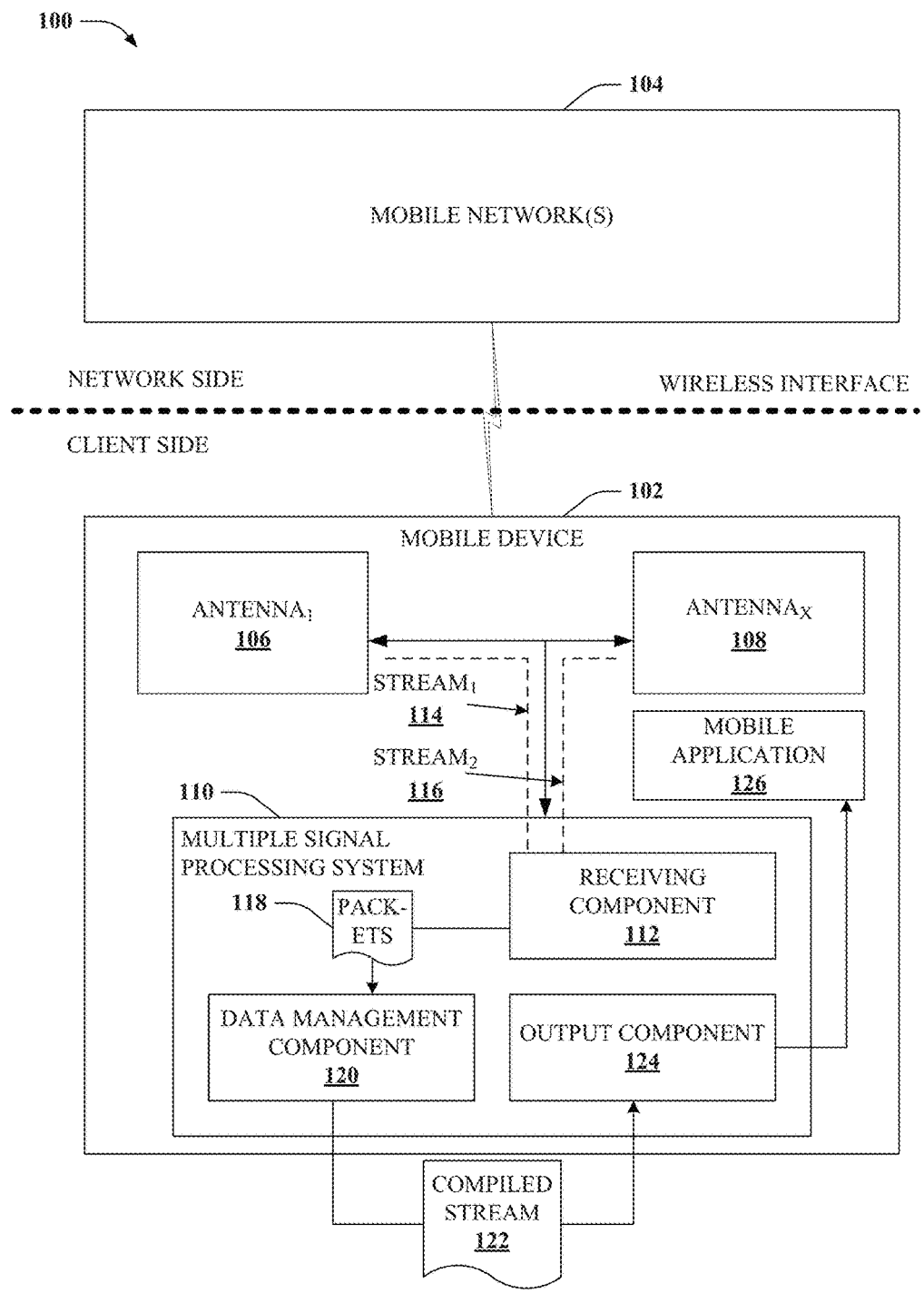
FIG. 1 illustrates a block diagram of an example system that provides Internet Protocol (IP) persistence in mobile communications, in some disclosed aspects.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, structures and devices are shown in block diagram form to facilitate describing the disclosed subject matter.

Where used in this application, the terms "component," "system," module", "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, a circuit, a logic gate, an object, an executable, a thread of execution, a program, or a computer. By way of illustration, both an application running on a server/client and the server/client can be a component. One or more components can reside within a process or thread of execution and a component can be localized on one computer or distributed between two or more computers. Also, components can execute from various computer readable media having various data structures stored thereon. The components may communicate via local or remote processes such as in accordance with a signal having one or more symbols, data packets, etc. (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor, a state machine, an integrated circuit, etc., therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or other suitable data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, refer to a wireless network component or appliance that serves and receives data, control, voice, video, sound, gaming, or other suitable data-stream or signaling-stream from a set of subscriber stations, except where context or definition warrants distinctions among the term(s). Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Increase in consumer use of wireless communication and near ubiquitous penetration of mobile electronic communication devices within the consumer public has put great demand on mobile communication service providers. This demand can vary, depending on content consumed by sectors of the public. For instance, circuit-switched voice traffic has one set of quality or performance goals, whereas packet-switched data and voice traffic often have a different set of quality or performance goals. Moreover, dynamic demographics of content consumption can vary with geographic location, time of day, or in response to large-scale public events (e.g., concerts, sporting events, rallies, political events, etc.), and can even vary among type of such events.

Mobile data services often benefit significantly from newer data-related networks. Browsing applications can perform significantly better in a third generation (3G) wireless network, for instance, as compared with a second generation (2G) wireless network. Similarly for streaming video, streaming audio, and packet-switched voice applications (e.g., voice over Internet Protocol (IP), audio chat, audio and video chat, etc.). In contrast, circuit-switched voice traffic often observes limited benefits on a 3G network, and can even be negatively impacted if the 3G network is at or near subscriber capacity, and few wireless resources are available. In many day-to-day circumstances, it is ideal for mobile network operators to alleviate loading on 3G networks.

One way to support a packet-based data network is through supplementary packet-based networks. As one particular example, a 3G macro base station network can be supplemented by a local or regional access point base station network. As utilized herein, a macro base station refers to a cellular tower, transceiver, or the like, communicating with subscriber terminals on licensed cellular frequencies. Access point base stations, as utilized herein, employ non-cellular frequencies, whether licensed or unlicensed. An example of an access point base station, then, can include a Wi-Fi router, transceiver, base station, or the like. As utilized herein, Wi-Fi is intended to refer to wireless signaling including the IEEE 802.11 family of standards (e.g., 802.11 a, b, g, n, etc.), but is not intended to be limited by time-varying associations between the Wi-Fi trademark owned by Wi-Fi Alliance and goods or services sold under that trademark. Rather, Wi-Fi is utilized herein to refer to any now existing 802.11 wireless standards (incorporated herein by reference in their entireties) or future developed 802.11 wireless standards. Furthermore, it should be appreciated, that access point base stations are not limited to Wi-Fi base stations, but can include other wireless communication equipment utilizing 802.xx standards (e.g., BlueTooth®, ZigBee®, . . . ).

To alleviate load on macro networks, access point base stations can be deployed as an alternative wireless network access point for wireless data services. In many deployments, access point base stations can provide a cost effective way to supplement demand for mobile data services. Current deployments require a user to select Wi-Fi as an access technology. New approaches are being developed in which a mobile device can switch to a Wi-Fi access point automatically, but this introduces a problem when an IP session exists for such a mobile device. In some wireless protocols, IP sessions are not maintained during transition from one network to an access point network (e.g., from 3G to Wi-Fi). Implementation of automatic Wi-Fi selection can result in dropped calls, interrupted data downloads, loss of browsing service, interrupted streaming media, and the like. Particularly for sessions involving streaming media, these interruptions can significantly impact user experience of mobile service.

Example embodiments of the subject disclosure can provide a mechanism to provide IP session persistence in transitioning from a macro deployment to an access point deployment. This can mitigate or avoid barriers related to automatic access point selection, or access point handover, and enabling subscriber equipment to maintain calls or data applications when traveling from macro coverage to access point coverage. In an example embodiment, IP sessions persistence can provide a much more seamless transition for mobile communication and media services for deployments having multiple access point technologies.

In various aspects of the subject disclosure, mobile communications incorporating Internet Protocol (IP) persistence is described herein. IP persistence can be implemented for a mobile device receiving IP data content over a mobile network. In an example embodiment, if the mobile device encounters a region of poor wireless coverage, the IP data content can be transmitted to the mobile device over a plurality of base stations. Thus, the IP persistence can comprise duplicating the IP data content and transmitting separate independent wireless transmissions of the content to the mobile device from separate cells or separate transmitters.

In at least one aspect, the IP persistence can be implemented by leveraging a deployment of access point base stations (e.g., Wi-Fi routers, Femto cells, etc.) in conjunction with a macro deployment. If a mobile device receiving IP data content encounters a poor coverage zone, stored locations of access point transmitters can be referenced to identify an access point base station in range of the mobile device. Upon identifying a suitable access point base station, the IP data content can be delivered through a macro base station and an access point base station, concurrently. The content transmitted via the macro base station can be handed off to another macro base station similar to a mobile handover. Likewise, content transmitted via the access point base station can be handed off to another access point base station, utilizing mobility equipment deployed for the access point base stations.

In further aspects, IP data content can be sequenced for proper playback at a mobile device. Data packets copied for transmission over separate base stations can be given common sequence numbers in the separate streams, enabling the mobile device to properly compile the IP data content from the separate streams. In at least one aspect, the mobile device can selectively pick one data packet of a set of data packets having an identical sequence. Selection of a data packet can be based on successful decoding of the packet at the mobile device. In particular aspects, respective data packets can also be given a quality or performance metric based on a quality of service parameter, or quality of experience parameter, which can be utilized at least in part by the mobile device in selecting data packets.

In example aspects, mobile device location can be tracked over time to estimate a direction of travel for the mobile device. The mobile device location or direction of travel can be referenced against stored locations of network service problems. If the mobile device is within or near such a location, or headed toward such a location, IP persistence can be triggered to mitigate or avoid loss of service as a result of entering a region having poor coverage. In some aspects, triggering IP persistence can be conditioned on a mobile network policy, or mobile device policy. The mobile network policy can include a business plan, subscription plan, or the like, whereas mobile device policy can include capabilities of the mobile device (e.g., capability of receiving and decoding multiple streams concurrently, or multiple streams on different wireless technologies concurrently, etc.), user preferences, and so on.

As described herein, IP persistence can provide significant benefits in mobile communication. As mobile devices move throughout a geographic region, supplemental content transmissions can be initiated on multiple wireless transmissions to mitigate or avoid data loss on a particular wireless transmission. In some aspects, multiple transmissions can be conducted over disparate wireless technologies, to avoid or mitigate interference, poor signal, overcapacity, or like problems on a first wireless technology. Accordingly, various aspects of the subject disclosure improve wireless content delivery even known areas having service problems.

This description and the annexed drawings set forth in detail certain illustrative aspects of the disclosed subject matter. These aspects are indicative, however, of but a few of the various ways in which the principles disclosed herein can be employed and the disclosed subject matter is intended to include all such aspects and their equivalents. Aspects and features of the disclosed subject matter will become apparent from this detailed description when considered in conjunction with the drawings.

Referring to the drawings, FIG. 1 illustrates a block diagram of an example system 100 that can be configured to provide IP session persistence in conjunction with mobile communications, according to various aspects of the subject disclosure. System 100 can comprise a mobile device 102 communicatively connected to one or more mobile networks 104 over a wireless interface. Mobile network(s) 104 can comprise a macro base station deployment, and can also comprise one or more access point base station deployments, such as a Wi-Fi access point or network of Wi-Fi access points.

As depicted, mobile device 102 can comprise a plurality of radio antennas, including a first radio antenna, antenna$_1$ 106 through antenna$_X$ 108 (referred to collectively as antennas$_{1-X}$ 106-108), where X is a suitable integer greater than one. Further, the plurality of radio antennas can be configured to transmit and receive separate wireless data streams for mobile device 102, concurrently. In particular aspects, antenna$_1$ 106 can be configured to transmit and receive on a first radio frequency, whereas antenna$_X$ 108 can be configured to transmit and receive on a different radio frequency. As a particular example, antenna$_1$ 106 can be employed by mobile device 102 for wireless communication on a cellular frequency according to a cellular protocol, whereas antenna$_X$ 108 can be employed for wireless communication on a Wi-Fi frequency according to a Wi-Fi protocol, concurrently. It should be appreciated that antenna$_1$ 106 through antenna$_X$ 108 can be configured or reconfigured to communicate on different radio frequency technologies for different communications. For instance, antenna$_1$ 106 can be employed to communicate with a first wireless technology for one call (e.g., a first cellular frequency, a Wi-Fi frequency), and with a second wireless technology for another call (e.g., a second cellular frequency, the Wi-Fi frequency).

Additionally, mobile device 102 can comprise a multiple signal processing system 110, which can be configured to receive and process separate data streams over antennas$_{1-X}$ 106-108. Particularly, multiple signal processing system 110 can comprise a receiving component 112 that can be configured to receive a plurality of signals over a plurality of wireless channels via antennas$_{1-X}$ 106-108. In a particular example, the plurality of wireless channels can include a cellular wireless channel providing a first stream of data content, stream$_1$ 114, and a Wi-Fi wireless channel providing a second stream of data content, stream$_2$ 116. Receiving component 112 can be configured to pass data packets of the respective streams to a data management component 120 for reconstructing a transmitted data signal from the plurality of signals.

Data management component 120 can be configured to select a first subset of data packets from one of the plurality of signals (e.g., stream$_1$ 114) and a second subset of data packets from a second of the plurality of signals (e.g., stream$_2$ 116) and concatenate the first subset and second subset of data packets and generate a compiled stream 122. Compiled data stream 122 can be a reproduction of a transmitted data stream transmitted by mobile network(s) 104. Compiled stream 122 can be forwarded to an output component 124 that can be configured to provide the concatenated first subset and second subset of data packets to a mobile device application 126. Mobile device application 126 can be a suitable application configured to operate on a mobile device (e.g., a cellular phone, . . . ) and consume IP data content. Examples of mobile device application can include a web browser, a streaming video player, a streaming audio player, a streaming media player, a voice over IP (VoIP) application, or the like, or a suitable combination thereof.

In at least one aspect of the subject disclosure, the one of the plurality of signals and the second of the plurality of signals can be duplicate streams of IP data content. One of these duplicate streams can be transmitted by the mobile network(s) 104 over a macro base station, and the second of these duplicate streams can be transmitted over an access point base station, in a particular aspect of the subject disclosure. To compile the original IP data content, multiple signal processing system 110 can be configured to select one of each set of unique data packets from the duplicate streams, to derive the transmitted data packets. In a particular aspect, each data packet of a set of unique data packets can be given a sequence number, or other suitable identifier, to distinguish data packets of a set from data packets of another set. As described herein, selecting one data packet from each set can be based on a quality of service function, a quality of experience function (e.g., quality of service parameters coupled with playback capabilities of mobile device application 126 or mobile device 102), a signal quality function, or the like, or a suitable combination thereof. Selected data packets can be concatenated with other selected data packets to generate compiled stream 122, which can be forwarded to mobile device application 126 for playback at a user interface of mobile device 102.

Figure 2:
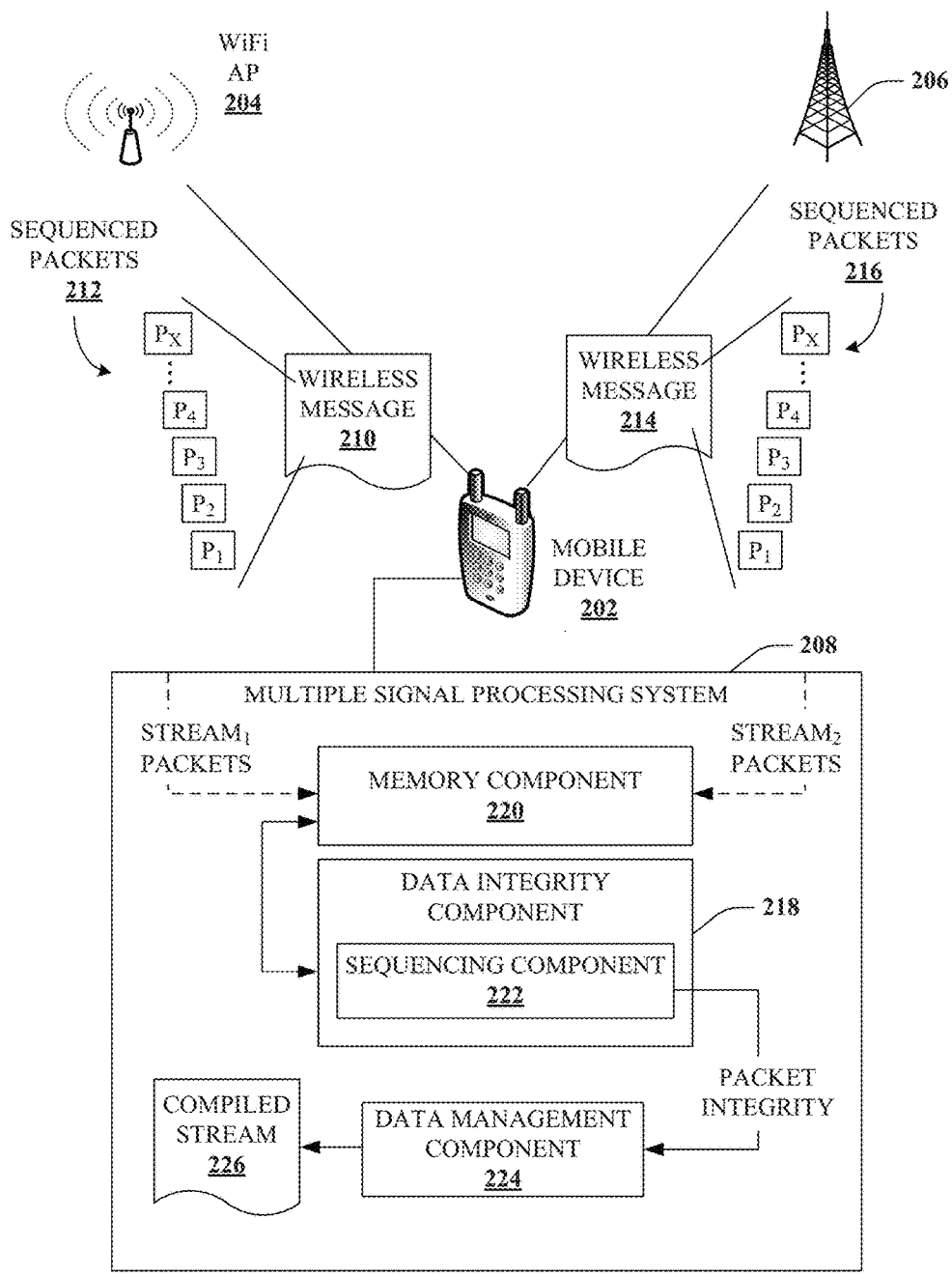
FIG. 2 depicts a block diagram of a sample system that decodes multiple concurrent streams at a mobile device according to particular aspects disclosed herein.

FIG. 2 illustrates a block diagram of an example system 200 implementing IP session persistence according to particular aspects of the subject disclosure. System 200 can comprise a macro base station deployment, including macro base station 206, in addition to an access point base station deployment, including Wi-Fi access point 204. Macro base station 206 and Wi-Fi access point 204 can be concurrently conducting wireless communication with a mobile device 202. For instance, Wi-Fi access point 204 can exchange wireless signals with a first antenna of mobile device 202 (e.g., see FIG. 1, infra) utilizing a Wi-Fi communication protocol, whereas macro base station 206 can exchange wireless signals with a second antenna of mobile device 202. In a particular aspect, this communication arrangement can be leveraged to implement the IP session persistence mentioned above. Particularly, a copy of IP data content can be transmitted by Wi-Fi access point 204 as a set of sequenced Wi-Fi data packets 212 within a first wireless message 210 to mobile device 202, while another copy of the IP data content can be transmitted by macro base station 206 as a set of sequenced cellular data packets 216 within a second wireless message 214. Thus, two copies of the IP data content are transmitted to mobile device 202, a first copy from Wi-Fi access point 204 and a second copy from macro base station 206.

In a particular aspect of the subject disclosure, respective copies of the IP data content are transmitted as respective sequenced packets. Packets containing similar data also include a common sequence number. Thus, as one illustrative example, sequenced packets 212 comprises a packet $P_1$ having a sequence number 1, a packet $P_2$ having a sequence number of 2, a packet $P_3$ having a sequence number 3, and so on, up to a packet $P_X$ having a sequence number of X, where X is a suitable positive integer. Each data packet within sequenced packets 212 has a corresponding data packet within sequenced packets 216 with an identical sequence number. Therefore, according to this example, sequenced packets 216 can comprise a packet having a sequence number 1, a packet having a sequence number 2, a packet having a sequence number 3, and so on, up to the packet having the sequence number X. Based on this arrangement, mobile device 202 can be configured on the assumption that data packets having identical sequence numbers include the same or similar subsets of the IP data content.

Mobile device 202 can comprise a multiple signal processing system 208 that can be configured for receiving, decoding, filtering and recompiling the IP data content from the sequenced packets 212 within wireless message 210 and the sequenced packets 216 within wireless message 214. In at least one aspect of the subject disclosure, multiple signal processing system 208 can be substantially similar to multiple signal processing system 110 of FIG. 1, infra; although the subject disclosure is not limited to this aspect(s), and in other aspects multiple signal processing system 208 can include some or all of the components and functionality, or other components and functionality of multiple signal processing system 110.

A memory component 220 can be configured to extend a look-ahead data buffer of multiple signal processing system 208 (or mobile device 202) in response to receiving a plurality of signals (e.g., wireless message 210 and wireless message 214) concurrently over the plurality of wireless channels with Wi-Fi access point 204 and macro base station 206. A data integrity component 218 can be configured to receive a first subset of data packets within a first data $stream_1$ associated with sequenced packets 212 and a second subset of data packets within a second data $stream_2$ associated with sequenced packets 216. Further, data integrity component 218 can be configured to compare a data packet of the first subset of data packets to a condition defined by a data integrity function, and to compare a corresponding second data packet of the second subset of data packets to a second condition defined by a second data integrity function. In particular aspects of the subject disclosure, the first and second data integrity functions can be related to a quality of service algorithm, quality of experience algorithm, or the like, associated with transmitted data packets or with respective wireless signals between mobile device 202 and Wi-Fi access point 204 and macro base station 206. As an example, the data integrity function(s) can be configured to identify a lower integrity data packet among a data packet of sequenced packets 212 and a corresponding second data packet of sequenced packets 216, in response to the comparisons. Packet integrity information can be provided to a data management component 224.

Multiple signal processing system 208 can further comprise a sequencing component 222 that can be configured to identify a sequence number within data packets of sequenced packets 212 and within data packets of sequenced packets 216. Upon identifying the sequence numbers, sequence component 222 can be configured to match data packets of sequenced packets 212 with corresponding data packets of sequenced packets 216 having an identical sequence number. The matched data packets can be provided to a data management component 224, which obtains packet integrity information for sets of corresponding data packets from data integrity component 218. Data management component 224 can then select one of a set of matched data packets, and compile the selected data packets to reproduce the IP data content transmitted by Wi-Fi access point 204 and macro base station 206. The compiled data packets are output in a compiled stream message 226, which can be utilized by an application of mobile device 202 to playback the information contained in the IP data content on user interface components of mobile device 202.

Figure 3:
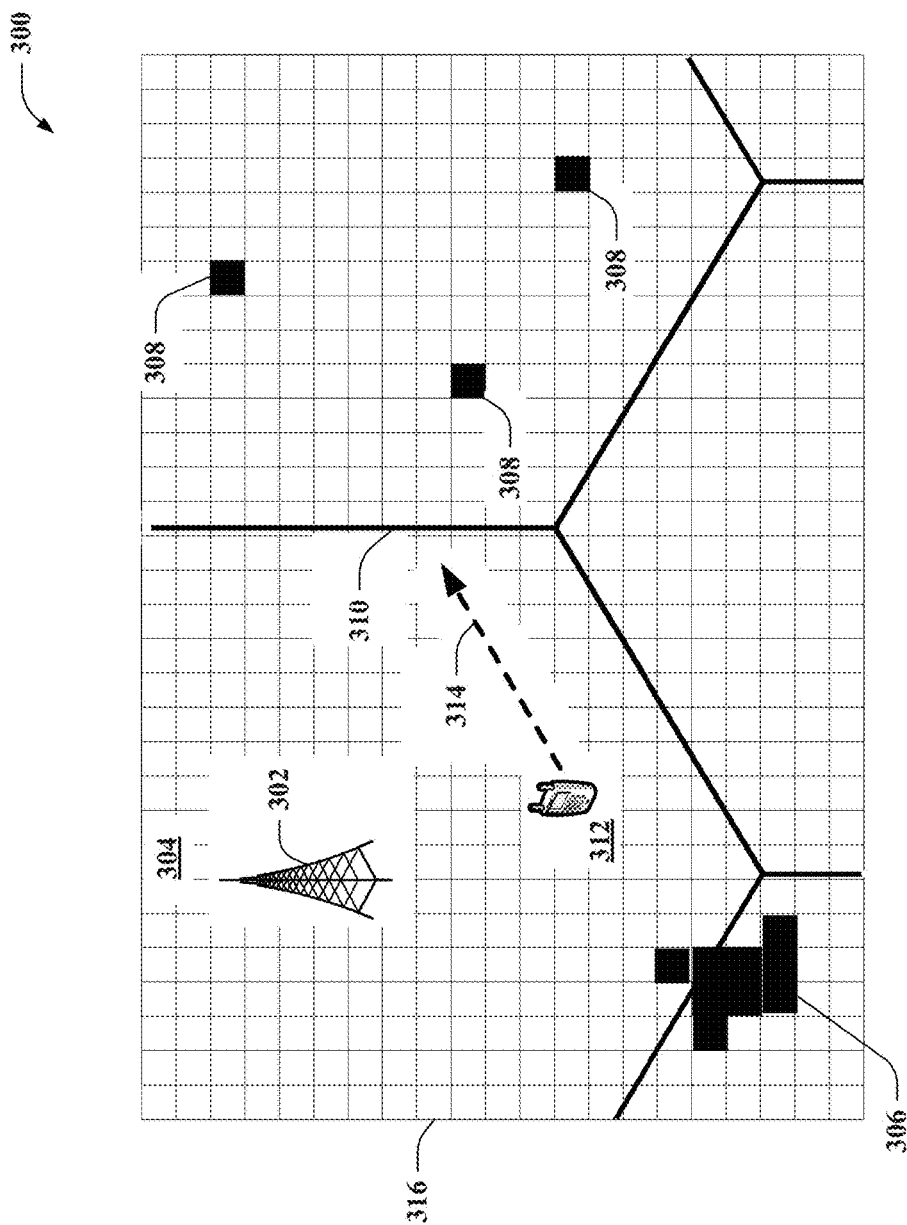
FIG. 3 illustrates a diagram of an example mobile network coverage area having locations with poor wireless service, according to one or more aspects.

FIG. 3 illustrates a diagram of an example network region 300 according to aspects of the subject disclosure. Network region 300 can comprise a macro base station 302 configured for serving a cell 304 of network region 300. Cell 304 is bounded roughly by a hexagonal boundary 310, and borders other cells of network region 300, as depicted. In addition, network region 300 can comprise one or more dead zones, depicted by black squares. Dead zones are areas of poor cellular coverage within network region 300. A suitable metric for determining what constitutes poor cellular coverage can be employed by a network service provider operating a macro base station within network region 300 (a deployment that includes macro base station 302). The metric can be compared with transmissions received by macro base station 302 from a mobile device 312 (or other mobile devices), or transmissions received at the mobile device 312 from macro base station 302, or a suitable combination thereof. Signal metrics from different geographic segments 316 (e.g., illustrated by respective squares of network region 300) of network region 300 can be utilized to evaluate the respective geographic segments 316. Geographic segments 316 having signal metrics that satisfy a condition defined by a function that establishes the metric for poor cellular coverage, can be labeled a dead zone. Dead zones are listed as black geographic regions in network region 300. Single dead zones 308 are labeled as single black squares. A larger region with multiple contiguous dead zone segments is listed in aggregated dead zone 306. Locations of geographic segments 316 having dead zones can be stored in a data store by the network service provider, and utilized to determine whether mobile device 312 is within or nearing a dead zone geographic segment 316.

A mobile network service provider can utilize stored locations of single dead zones 308 and aggregated dead zones 306, in conjunction with a location of mobile device 312 to determine whether mobile device 312 is in danger of receiving poor wireless coverage. This determination can facilitate predicting poor coverage and implementing IP session persistence to mitigate or avoid negative consequences of poor coverage.

In at least one aspect of the subject disclosure, a network service provider can estimate a direction of travel 314 of mobile device 312 and predict whether poor coverage will result from the direction of travel 314. As depicted by the dashed arrow, mobile device 312 can be moving within network region 300 along the direction of travel. By comparing the direction of travel 314 with locations of single dead zones 308 and aggregated dead zones 306, an estimation can be made whether mobile device 312 will encounter a dead zone. This estimation can be utilized to trigger IP session persistence to mitigate or avoid loss of service for mobile device 312.

Figure 4:
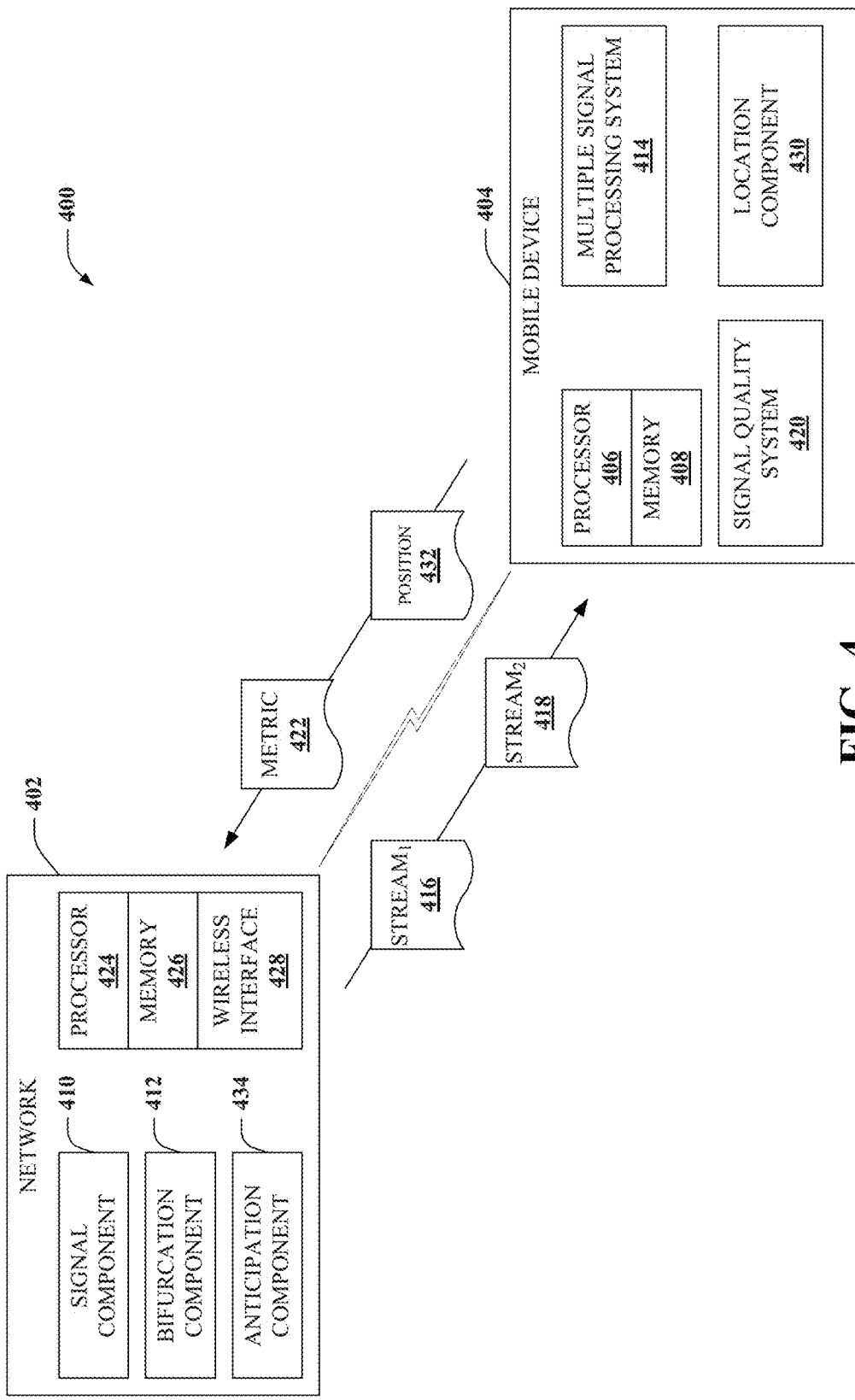
FIG. 4 depicts a block diagram of a sample wireless communication between a mobile network and a mobile device according to some aspects.

FIG. 4 illustrates a block diagram of an example wireless system 400 configured to provide IP session persistence in mobile communications. Wireless system 400 can comprise a network 402 configured for wireless communication with a mobile device 404. Network 402 can communicate with mobile device 404 from a plurality of base stations, including at least a macro base station and an access point base station. The plurality of base stations can be represented generally as a wireless interface 428.

Mobile device 404 can comprise one or more processors 406 for executing instructions stored in one or more memories 408. The instructions can be related to other systems and components of mobile device 404. Likewise, network 402 can comprise one or more processors 424 for executing instructions in one or more memories 426 associated with components of network 402. Particularly, network 402 can comprise a signal component 410 that can be configured to estimate signal performance of mobile device 404. The estimation can be based at least in part on position of mobile device 404 relative to a set of stored locations for which network signal performance satisfies a condition defined by a performance function (e.g., signal strength, signal quality, quality of service, quality of experience, or other suitable performance metrics). If mobile device 404 enters or comes near one of the set of stored locations, or optionally where a wireless signal between mobile device 404 and a first base station (e.g., a macro base station, an access point base station, . . . ) fails to satisfy the condition, network 402 can be configured to identify an alternate network access point suitable for serving mobile device 404. A bifurcation component 412 can be configured to cause content to be duplicated and transmitted to mobile device 404 via the first base station and an alternate network access point concurrently. The duplicated transmissions are depicted by wireless stream$_1$ 416 and wireless stream$_2$ 418. The duplicated streams can be received at mobile device 404 and processed by multiple signal processing system 414 to reproduce data content transmitted by the respective base stations, as described herein (e.g., see FIGS. 1 and 2, supra).

In some aspects, mobile device 420 can comprise a signal quality system 420, which can be configured to report a signal quality metric 422 to network 402. The signal quality metric can be utilized by bifurcation component 412 as a second condition in determining whether to duplicate content and cause the duplicated content to be transmitted concurrently by a macro base station and an access point base station to mobile device 404. For instance, bifurcation component 412 can be configured, as a first condition, to determine whether mobile device 404 is within or near a set of stored networks location associated with poor wireless service. As a second condition, bifurcation component can compare metric 422 to a signal performance metric to determine whether an existing signal between mobile device 404 and the first base station is adequate. Bifurcation component 412 can be configured to cause the content to be duplicated, as described above, upon satisfaction of the first condition, satisfaction of the second condition, or satisfaction of the first and second conditions. Such configuration can be implemented as a policy by a service provider that controls network 402.

In particular aspects of the subject disclosure, network 402 can comprise an anticipation component 434 configured to monitor changes in position of mobile device 404. The position can be determined solely by network positioning techniques employed by network 402, in one aspect. In another aspect, mobile device 404 can comprise a location component 430 (e.g., a global positioning system (GPS), a user location input entered on a user interface of mobile device 404, or the like) that generates a position 432 of mobile device 404 and that sends position 432 to network 402 in a wireless message. In yet another aspect, a combination of the foregoing can be employed to acquire and monitor changes in the position of mobile device 404. By monitoring the position, anticipation component 434 can anticipate a future position of mobile device 404 (e.g., see direction of travel 314 of FIG. 3, supra) relative to a subset of the set of stored locations, and trigger bifurcation component 412 to send content to mobile device 404 in wireless stream$_1$ 416 and wireless stream$_2$ 418 over respective network base stations if the future position interacts with the subset of the stored locations.

Figure 5:
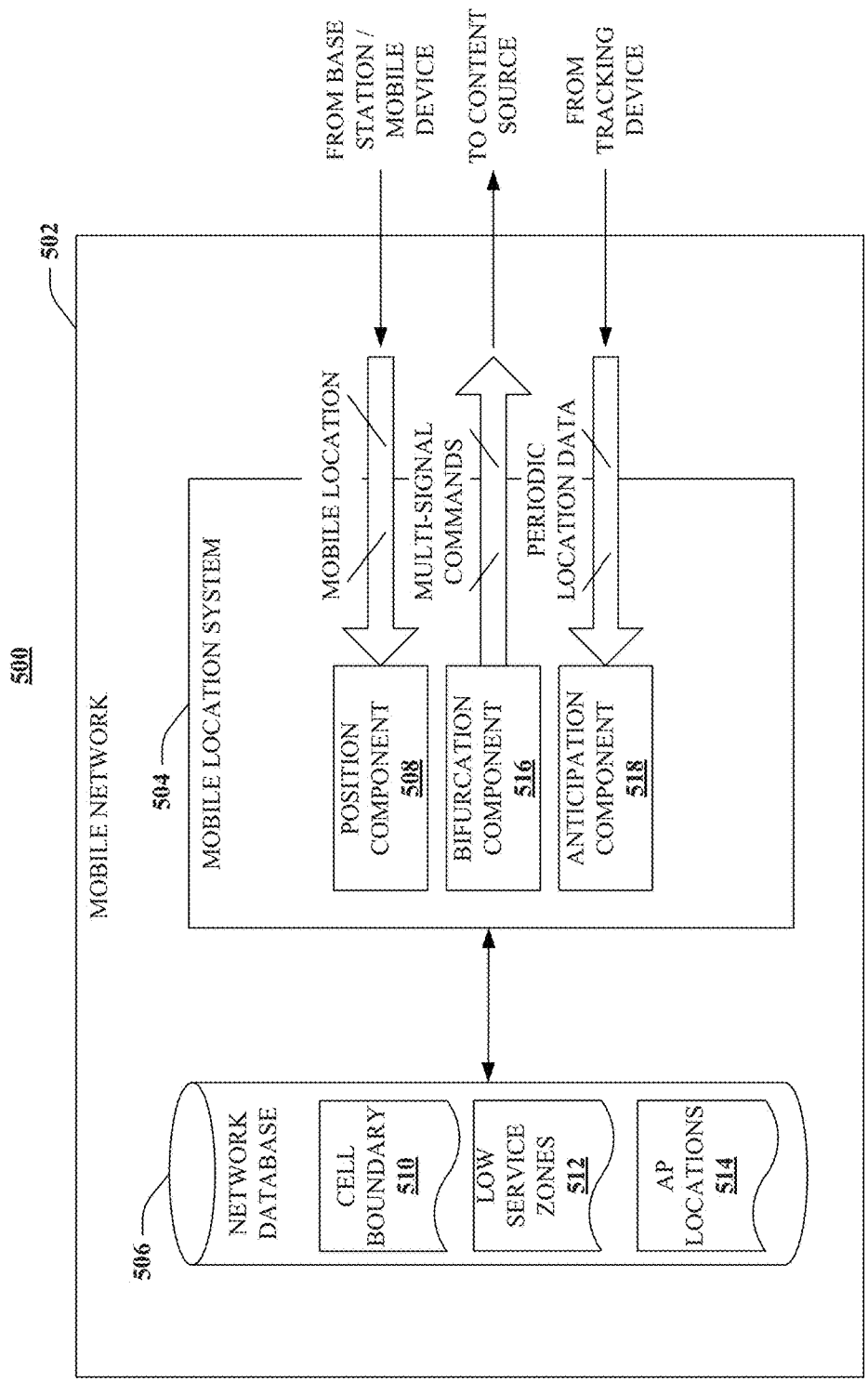
FIG. 5 illustrates a block diagram of an example network entity configured for providing IP persistence in mobile communications.

FIG. 5 illustrates a block diagram of an example network system 500 according to additional aspects of the subject disclosure. Network system 500 can comprise a mobile network 502, which can include a plurality of radio access network deployments (not depicted, but see Wi-Fi access point 204 and macro base station 206 of FIG. 2, supra) communicatively connected to a mobile location system 504. Mobile location system 504 can also be communicatively connected to a network database 506. Network database 506 can comprise stored information pertaining to network service quality. Particularly, network database 506 can comprise cell boundary locations stored in a cell boundary file 510, low service zone locations stored in a low service zone file 512, and access point base station locations stored in an access point location file 514.

Mobile location system 504 can be configured to determine whether a mobile device is within or will come within a poor service quality region. In such case, mobile location system can be further configured to determine whether an IP session is active for the mobile device. If the mobile device is within or will come within the poor service quality region, and has an active IP session, IP session persistence can be implemented for the mobile device, to mitigate or avoid loss of service for the IP session.

Mobile location system 504 can comprise a position component 508 configured to obtain position data for a mobile device served by mobile network 502. The position data can derived from signals received by a set of base stations, which are forwarded to position component 508, or can be generated by the mobile device and transmitted to the base station. Network position data can be derived from a network multi-lateration process, timed fingerprint location process (e.g., as provided in U.S. patent application Ser. No. 12/724,424 entitled "Timed Fingerprint Location in Wireless Networks" and filed Feb. 25, 2010, the entirety of which is incorporated by reference herein), or another suitable network-facilitated mobile positioning process.

Once obtained, mobile position information is referenced against stored locations of cell boundaries contained in cell boundaries file 510 (e.g., see cell boundary 310 of FIG. 3, infra), or referenced against stored locations of poor wireless service contained in low service zones file 512, or a combination thereof. Based on position of the mobile device relative to cell boundaries or other stored problem areas, an assessment can be made as to whether the mobile device is at risk of service loss. If the assessment satisfies a service loss condition, a bifurcation component 516 can be executed. Bifurcation component 516 can be configured to reference a list of stored access point base stations (e.g., Wi-Fi base stations, Femto cell locations, . . . ) relative to the position of the mobile device. If a suitable access point base station is identified, for instance that is within wireless range of the mobile device, bifurcation component 516 can be configured to issue a command to the mobile device, instructing the mobile device to register for wireless service on the identified access point base station, and to initiate multi data stream processing (e.g., see FIGS. 1 and 2, infra).

Further to the above, bifurcation component 516 can be configured to issue a command to an IP content source to split the IP content into multiple data streams, and transmit at least a first of the multiple data streams to a macro base station serving the mobile device, and at least a second of the multiple data streams to the identified access point base station. As an alternative, bifurcation component 516 can be configured to instruct the IP content source to send the IP content to mobile location system 504, which can in turn be configured to generate the multiple data streams, and transmit respective ones of the data streams to the macro base station and the access point base station, as described herein. In some aspects, bifurcation component 516 can be configured to include a packet sequence within corresponding data packets of the multiple streams, linking data packets that carry the same content. The packet sequence can be utilized by the mobile device to reconstruct the IP content from the multiple data streams. Optionally, bifurcation component 516 can be further configured to instruct the respective base stations to include a quality metric within respective data packets transmitted by those base stations. The quality metric can be a metric configured for indicating a quality of service, quality of experience, signal strength, etc., parameter of respective wireless streams. The mobile device can utilize the quality metric at least in part to reconstruct the IP content, by selecting one of a set of data packets sharing a common sequence number that has the best quality metric, for instance.

In some aspects of the subject disclosure, mobile location system 504 can comprise an anticipation component 518 that receives periodic or updated position information for the mobile device as a function of time. The updated position information can be utilized to derive a direction of travel for the mobile device for estimating whether the mobile device will encounter a cell boundary or stored poor service area at some future point. If anticipation component 518 determines mobile device is at risk of losing service by entering the cell boundary or poor service area, bifurcation component 516 can be triggered to search for an access point base station and implement the multiple data streams as described above and elsewhere herein. By proactively tracking mobile location and anticipating direction of travel, risk of service loss can be mitigated by identifying suitable access point base stations and implementing IP session persistence.

FIGS. 6A, 6B and 6C illustrate example use cases for which IP sessions persistence can be employed to mitigate or avoid loss of service in mobile communications, according to one or more aspects of the subject disclosure. FIG. 6A illustrates a wireless environment 600A comprising a mobile device 602A having a strong wireless signal 603A with a macro base station 604A. Wireless environment 600A also includes signal obstructions, such as foliage 606A and buildings 610A, as well as a Wi-Fi access point 608A and a second macro base station 612A. Mobile device 602A having a strong wireless signal with macro base station 604A is not hindered by foliage 606A or buildings 610A, and little risk of signal loss can be expected while mobile device 602A maintains its current location. In some aspects of the subject disclosure, if mobile device 602A is anticipated to move toward a signal obstruction, IP session persistence can be initiated for mobile device 602A by transmitting content to mobile device 602A via macro base station 604A and Wi-Fi access point 608A concurrently.

FIG. 6B illustrates a wireless environment 600B similar to wireless environment 600A, in which a mobile device 602B is at least partially obstructed by foliage 606B. Mobile device 602B has a limited wireless signal 605B with a macro base station 604B, as depicted by the dashed signal, as a result of physical obstruction of the limited wireless signal 605B by an obstruction 606B (e.g., a set of trees, foliage, heavy underbrush, etc.). A second obstruction 610B obstructs signals between mobile device 602B and a second macro base station 612B, preventing a handover to the second macro base station 612B. In this case, IP session persistence can be implemented by leveraging a Wi-Fi base station 608B, which shares a strong wireless signal 603B with mobile device 602B. IP data content can be transmitted over limited wireless signal 605B and strong wireless signal 603B concurrently. In some aspects, corresponding data packets can be sequenced identically, enabling mobile device 602B to select one of each set of corresponding data packets to reconstruct a transmitted signal. In a particular aspect, macro base station 604B and Wi-Fi base station 608B can include a quality metric within the respective transmitted data streams, or within respective data packets, which can be employed at least in part by mobile device 602B for selecting a data packet among the sets of corresponding data packets. For instance, mobile device 602B can decode respective sets of data packets, and if only one data packet of a set is successfully decoded, the one data packet can be used in reconstructing the transmitted signal. Where more than one data packet of a set is successfully decoded, the quality metric can be referenced in selecting among successfully decoded data packets of the set. Transmission of multiple signals from macro base station 604B and Wi-Fi base station 603B can persist until mobile device 602B re-establishes a strong signal with a macro base station (e.g., macro base station 604B, second macro base station 612B), or until the limited wireless signal 605B or strong wireless signal 603B is no longer suitable for transmitting and receiving data with mobile device 602B.

FIG. 6C illustrates a wireless environment 600C similar to wireless environment 600A and wireless environment 600B, in which a mobile device 602C hands off to a second macro base station 612C and no longer maintains an active wireless link with macro base station 604C. Mobile device 602C maintains a limited wireless signal with Wi-Fi base station 608C that is partially obstructed by obstruction 610C, and an unobstructed strong signal 603C with second macro base station 612C. Mobile device 602C is not affected by obstruction 606C. In wireless environment 600C, IP session persistence can be implemented utilizing limited wireless signal 605C and strong signal 603C, as described above with regard to wireless environment 600B. Alternatively, the IP session persistence can be terminated, and a conventional IP session can be maintained with second macro base station 612C utilizing strong signal 603C. As yet another alternative, a network can search for another Wi-Fi base station (not depicted) having a better wireless link with mobile device 602C than limited wireless signal 605C, with which to conduct the IP session persistence.

The aforementioned systems have been described with respect to interaction between several systems, components or communication interfaces. It should be appreciated that such systems and components can include those components or sub-components specified therein, some of the specified components or sub-components, or additional components. For example, a system could include mobile network 502, comprising mobile location system 504 and network database 506, and mobile device 102 comprising multiple signal processing system 110, or a different combination of these or other entities. Sub-components could also be implemented as modules communicatively coupled to other modules rather than included within parent modules. Additionally, it should be noted that one or more components could be combined into a single component providing aggregate functionality. For instance, receiving component 112 can include output component 124, or vice versa, to facilitate receiving multiple data streams and outputting a single compiled data stream to a mobile application, by way of a single component. The components can also interact with one or more other components not specifically described herein but known by those of skill in the art.

FIGS. 7, 8, 9 and 10 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 7:
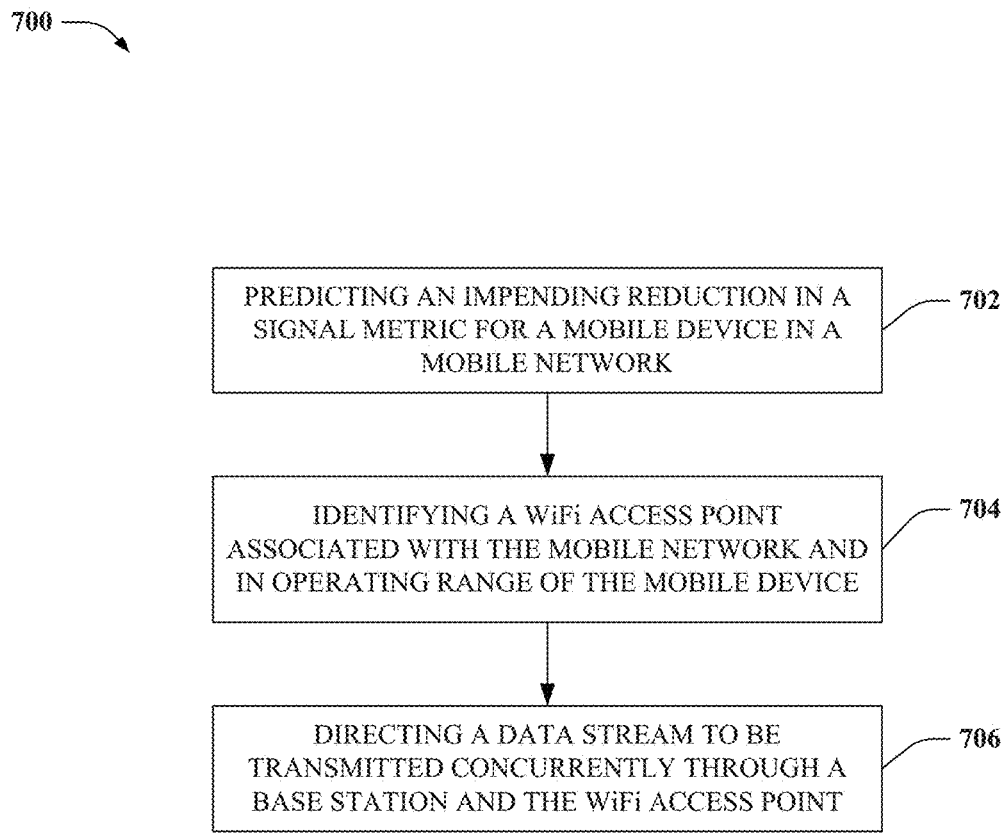
FIG. 7 illustrates a flowchart of an example method for providing IP persistence in mobile communications, according to other aspects.

FIG. 7 depicts a flowchart of an example method 700 for providing IP session persistence in mobile communications according to additional aspects of the subject disclosure. Method 700, at 702, can comprise predicting an impending reduction in a wireless signal metric for a mobile device operating within a mobile network. The predicting can be based at least in part on determining a location of the mobile device within the mobile network, and referencing the location against a set of stored network locations having respective signal levels that satisfy a condition defined by a performance function. In some aspects, predicting the impending reduction in the wireless signal metric further comprises determining the location of the mobile device to be within at least one of the set of stored network locations.

At 704, method 700 can comprise identifying a Wi-Fi access point associated with the mobile network and within operating range of the mobile device. In a particular aspect, identifying the Wi-Fi access point can further comprise referencing a set of stored Wi-Fi locations and determining whether the mobile device is within operating range of at least one of the set of stored Wi-Fi locations. Optionally, method 700 can further comprise instructing the mobile device to establish a wireless communication with the Wi-Fi access point in response to identifying the Wi-Fi access point to be within the operating range, and in response to predicting the reduction in the wireless signal metric.

At 706, method 700 can comprise directing a data stream associated with communication content to be transmitted to the mobile device concurrently through a base station of the mobile network and through the Wi-Fi access point, in response at least to the predicting the reduction in the wireless signal metric. In at least one aspect, method 700 can further comprise directing a source of the data stream to include a sequencing number at least for data packets of the data stream that are transmitted concurrently through the base station and through the Wi-Fi access point. The sequencing number can be implemented to correlate like data packets comprising like information. As a specific example, directing the data stream to be transmitted concurrently through the base station and through the Wi-Fi access point further comprises instructing a source of the communication content to add a sequence number to data packets of the communication content, duplicate the data packets, and address one set of duplicated data packets to the base station and a second set of duplicated data packets to the Wi-Fi access point. In alternative or additional aspects, directing the data stream to be transmitted concurrently through the base station and through the Wi-Fi access point can further comprise receiving data packets of the data stream, sequencing the data packets in an order of content, duplicating the sequenced data packets, and sending a first set of duplicated sequenced data packets to the base station and a second set of duplicated sequenced data packets to the Wi-Fi access point. In at least one additional aspect, method 700 can further comprise terminating the directing the data stream to be transmitted through the base station and through the Wi-Fi access point in response to the wireless signal metric satisfying a condition defined by a performance function.

Figure 8:
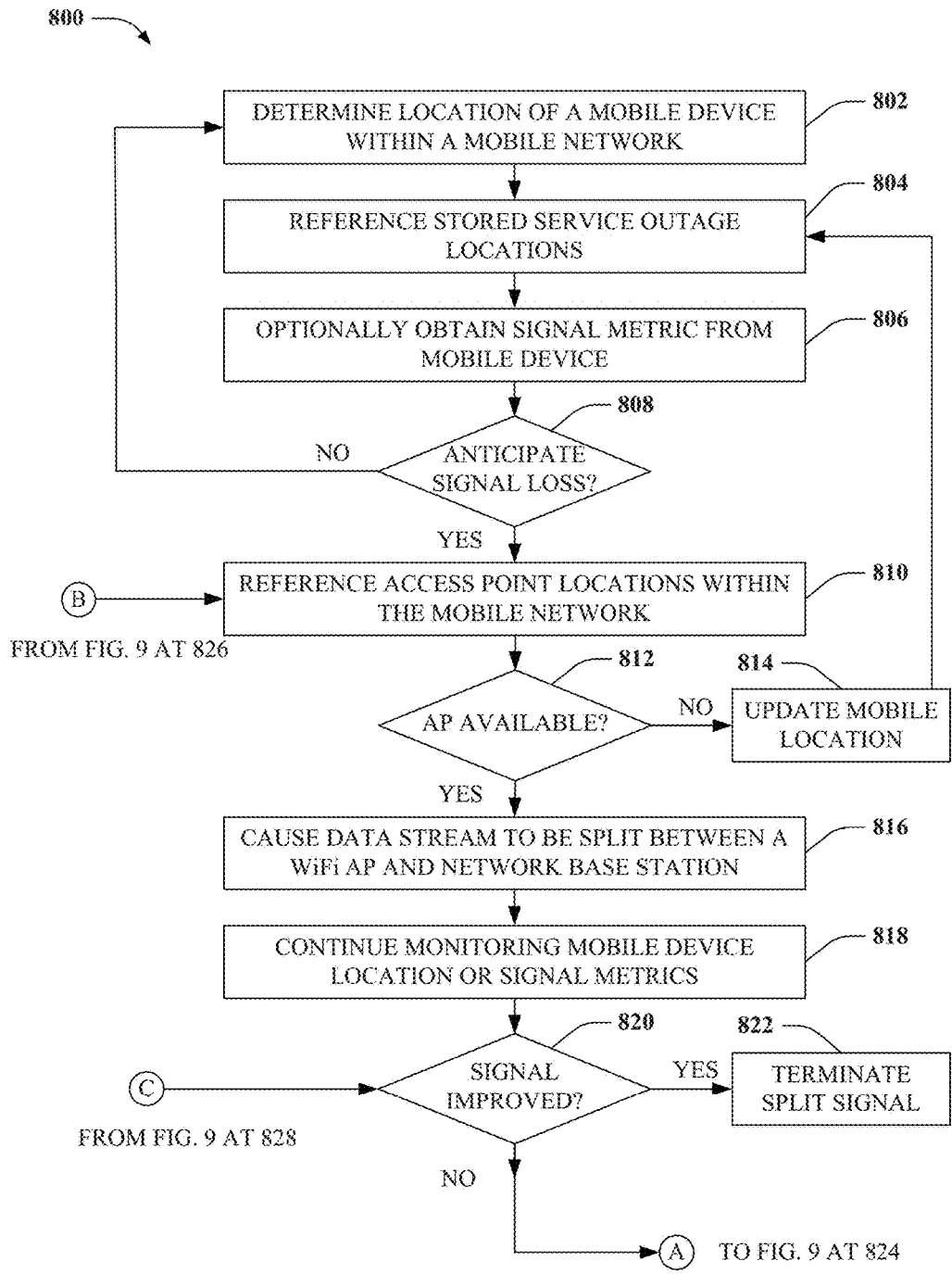
FIGS. 8 and 9 depict a flowchart of a sample method for providing IP persistence with a plurality of data streams from a plurality of base stations, in an aspect.
Figure 9:
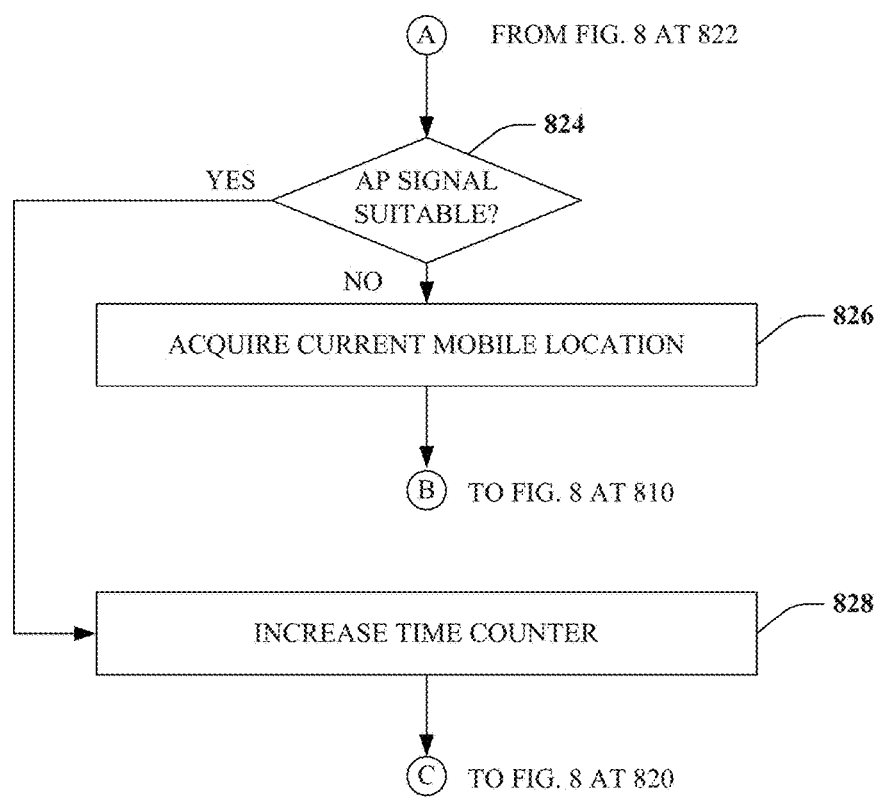

FIGS. 8 and 9 illustrate a flowchart of a sample method 800 for providing IP session persistence in mobile communications according to one or more specific aspects of the subject disclosure. At 802, method 800 can comprise determining a location of a mobile device within a mobile network. At 804, method 800 can comprise referencing stored service outage locations within the mobile network. At 806, method 800 can comprise optionally obtaining a signal metric from the mobile device. At 808, a determination can be made as to whether a loss of signal is anticipated for the mobile device. The determination can be made by identifying whether the mobile device is within or near a service outage location, or by identifying whether the signal metric satisfies a condition defined by a signal attenuation function, or a suitable combination thereof. If no anticipated signal loss is determined, method 800 can return to reference number 802; otherwise method 800 can proceed to 810.

At 810, method 800 can comprise referencing access point base station locations within the mobile network. At 812, method 800 can determine whether a suitable access point base station is available. If not, method 800 can proceed to 814 and update the mobile device location, and return to reference number 804; otherwise method 800 can proceed to 816.

At 816, method 800 can comprise causing an IP data stream to be split between an identified access point base station and a macro base station. At 818, method 800 can comprise continuing monitoring of the mobile device location or mobile device signal metrics. At 820, a determination can be made as to whether the signal metrics have improved, or whether the mobile device has left a service outage location. If so, method 800 can proceed to 822 and terminate the split IP data stream. Otherwise, method 800 can proceed to 824.

Referring to FIG. 9, at 824 method 800 can comprise determining whether the access point base station signal is suitable for delivering the IP data stream to the mobile device. If not, method 800 can proceed to 826 and acquire current mobile device location information, and return to reference number 810. If the access point base station is suitable for delivering the IP data stream to the mobile device, method 800 can proceed to 828 and increase a time counter, and return to reference number 820.

Figure 10:
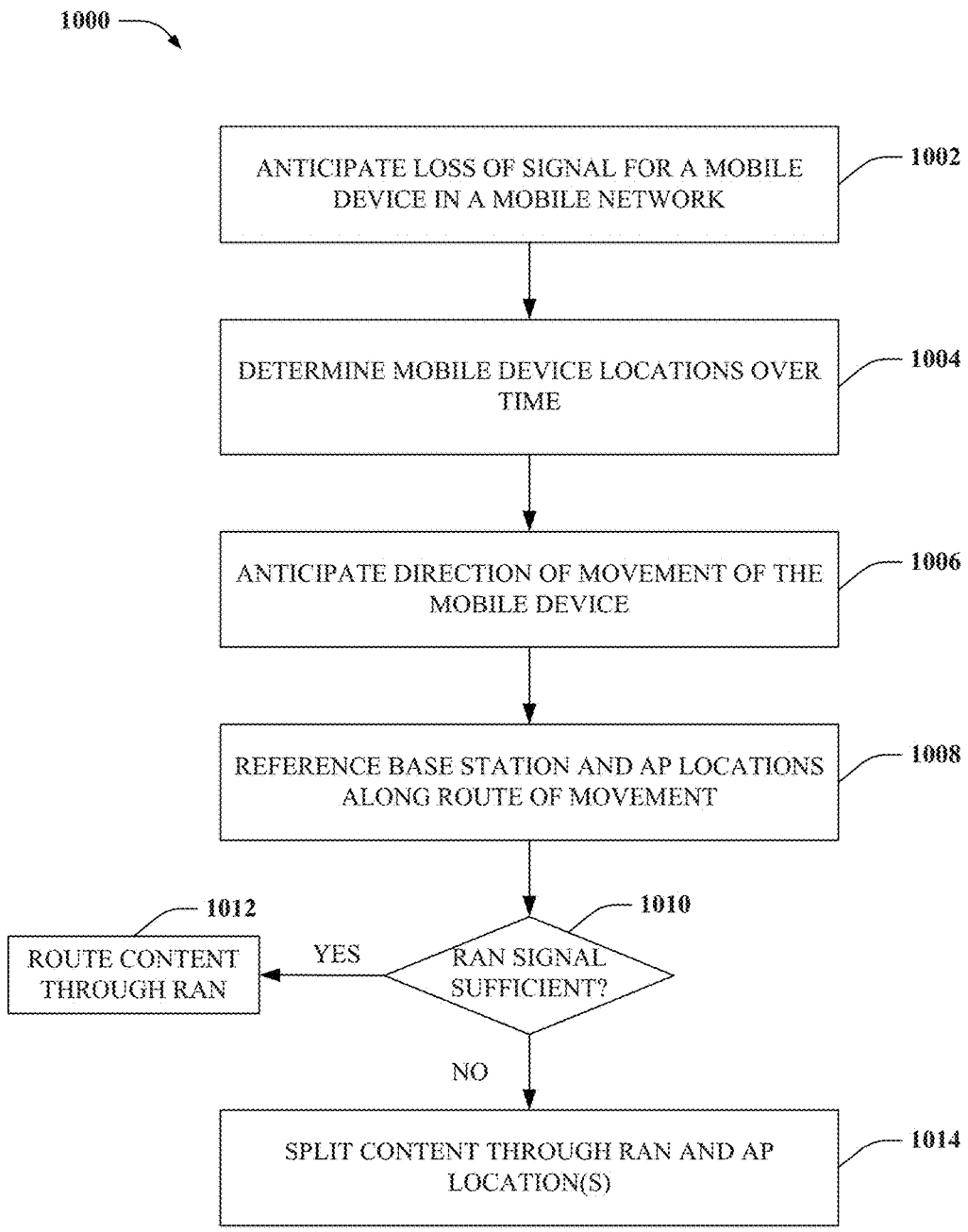
FIG. 10 illustrates a flowchart of an example method of estimating mobile travel and triggering IP persistence in response to the estimate, in other aspects.

FIG. 10 illustrates a flowchart of a sample method 1000 for anticipating a dropped call for a mobile device and implementing IP session persistence to mitigate or avoid the dropped call. At 1002, method 1000 can comprise anticipating whether a loss of signal will occur for a mobile device operating within a mobile network. At 1004, method 1000 can comprise tracking location of the mobile device over time. At 1006, method 1000 can comprise anticipating a direction of movement of the mobile device. At 1008, method 1000 can comprise referencing base station and access point locations along the direction of movement. At 1010, a determination can be made as to whether a serving radio access network can provide sufficient signal quality or quality of experience for the mobile device. If so, method 1000 can proceed to 1012 and continue to route data content to the mobile device solely through the radio access network. If the serving radio access network cannot provide sufficient signal quality or quality of experience, method 1000 can proceed to 1014 and split content through the radio access network and through an access point location concurrently.

Figure 11:
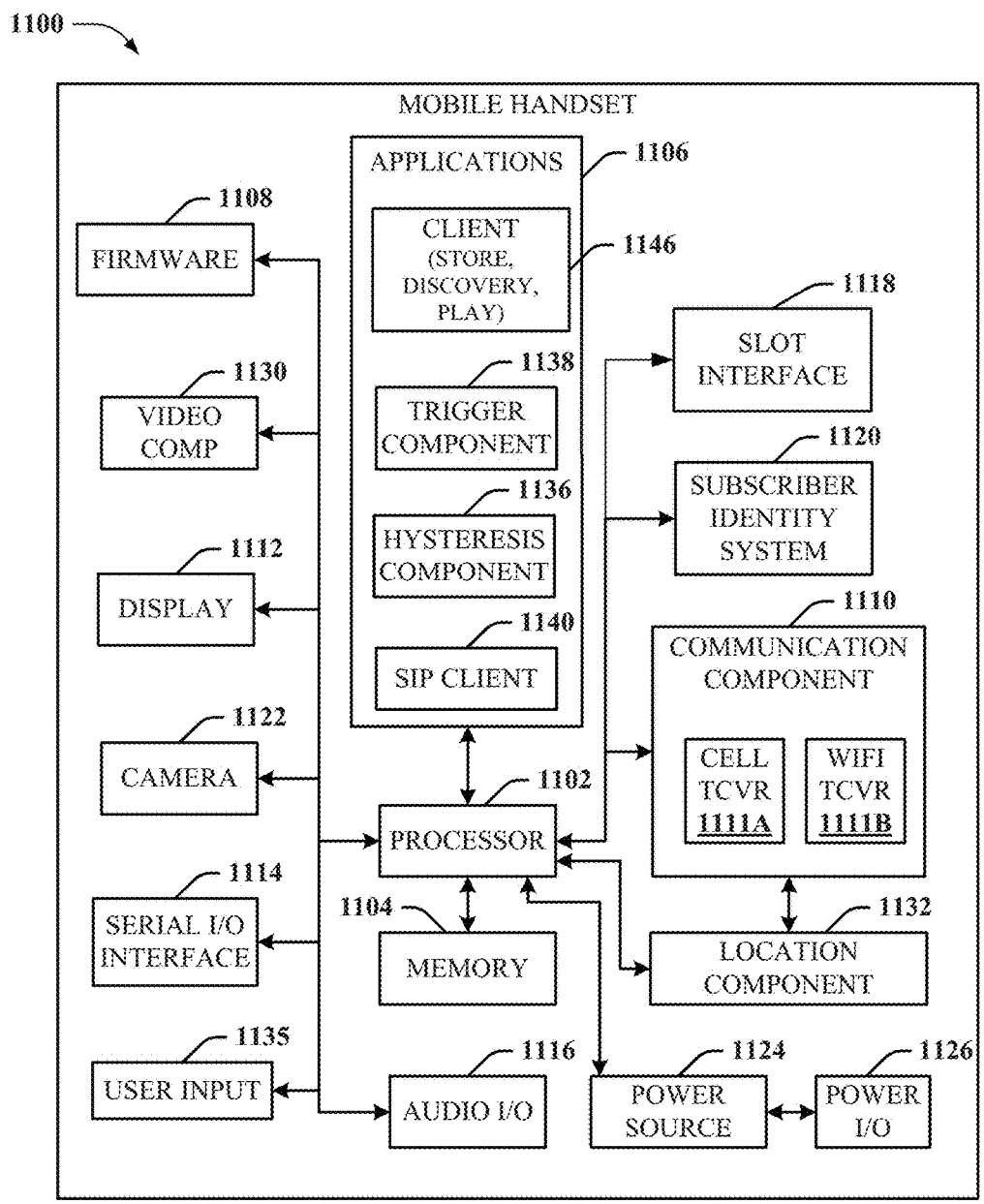
FIG. 11 depicts a block diagram of an example mobile handset that can be configured for operation in conjunction with one or more disclosed aspects.

Referring now to FIG. 11, illustrated is a schematic block diagram of an illustrative mobile device 1100 capable of maintaining concurrent wireless communication with a radio access network and an access point base station, in accordance with some embodiments described herein. Although a mobile handset 1100 is illustrated herein, it will be understood that other devices can be a mobile device, and that the mobile handset 1100 is merely illustrated to provide context for the embodiments described herein. The following discussion is intended to provide a brief, general description of an example of a suitable environment 1100 in which some of the various disclosed embodiments can be implemented. While the description includes a general context of computer-executable instructions embodied on a computer readable storage medium, those skilled in the art will recognize that the various aspects also can be implemented in combination with other program modules or as a combination of hardware, software or firmware.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices. Further, illustrated aspects of the subject disclosure can be practiced in distributed computing environments where certain tasks are performed by remote processing devices that are linked through a communications network (e.g., mobile handset 1100 communicating through a mobile communication network). In a distributed computing environment, systems and system components, as well as program modules can be located in both local and remote memory storage devices.

A computing device such as mobile handset 1100 can typically include a variety of media, which can include computer-readable storage media or communication media, which two terms are used herein differently from one another as follows.

Computer readable storage media can be any available storage media that can be accessed by a computer (e.g., mobile handset 1100) and includes both volatile and non-volatile media, removable and non-removable media. By way of example and not limitation, computer-readable storage media can be implemented in connection with any method or technology for storage of information, such as computer-readable instructions, data structures, program modules or unstructured data. Computer-readable storage media can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media typically embodies computer-readable instructions, data structures, program modules or other structured or unstructured data in a modulated data signal such as a carrier wave or other transport mechanism, and includes any suitable information delivery or transport media. The term "modulated data signal" or signals means a signal that has one or more of its characteristics set or changed in such a manner as to encode information in one or more signals. By way of example, and not limitation, communication media includes wired media such as a wired network or direct-wired connection, and wireless media such as acoustic, RF, infrared and other wireless media.

Mobile handset 1100 includes a processor 1102 for controlling and processing onboard operations and functions. A memory 1104 interfaces to the processor 1102 for storage of data and one or more applications 1106 (e.g., a video player software, user feedback or user input component software, etc.). Other applications can include voice recognition of predetermined voice commands that facilitate receipt of user input. The applications 1106 can be stored in the memory 1104 and/or in a firmware 1108, and executed by the processor 1102 from either or both the memory 1104 or the firmware 1108. The firmware 1108 can also store startup code for execution in initializing mobile handset 1100. A communications component 1110 interfaces to the processor 1102 to facilitate wired/wireless communication with external systems, e.g., cellular networks, VoIP networks, Wi-Fi networks, and so on. Here, the communications component 1110 can also include a suitable cellular transceiver 1111A (e.g., a global system for mobile communication (GSM) transceiver, a code division multiple access (CDMA) transceiver, . . . ) or an unlicensed transceiver 1111B (e.g., Wi-Fi, WiMAX) for corresponding signal communications. Mobile handset 1100 can be a device such as a cellular telephone, a PDA with mobile communications capabilities, and messaging-centric devices, and so on. The communications component 1110 can also facilitate communications reception from terrestrial radio networks (e.g., broadcast), digital satellite radio networks, and Internet-based radio services networks.

Mobile handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, video, etc.). The display 1112 can also display videos and can facilitate the generation, editing and sharing of graphical or video applications. A serial I/O interface 1114 is provided in communication with the processor 1102 to facilitate wired and/or wireless serial communications (e.g., USB, and/or IEEE 1194) through a hardware connection, and other serial input devices (e.g., a keyboard, keypad, and mouse). This supports updating and troubleshooting mobile handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

Mobile handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a personal area network, etc., through an ISP or broadband cable provider. Thus, VoIP traffic can be utilized by the handset 1100 and IP-based multimedia content can be received in either an encoded or decoded format.

A graphics processing component 1122 (e.g., a camera) can be provided for decoding encoded multimedia content. The graphics processing component 1122 can aid in facilitating the generation, playback, editing and sharing of graphical media. Mobile handset 1100 also includes a power source 1124 in the form of batteries and/or an AC power subsystem, which power source 1124 can interface to an external power system or charging equipment (not shown) by a power I/O component 1126.

Mobile handset 1100 can also include a video component 1130 for processing video content received and, for recording and transmitting video content. For example, the video component 1130 can facilitate the generation, editing and sharing of video media. A location tracking component 1132 facilitates geographically locating mobile handset 1100. A user input component 1134 facilitates the user inputting information, responses or selections into mobile handset 1100. The user input component 1134 can include such input device technologies such as a keypad, keyboard, mouse, stylus pen, or touch screen, for example.

Referring again to the applications 1106, a hysteresis component 1136 facilitates the analysis and processing of hysteresis data, which is utilized to determine when to associate with an access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with a SIP registrar server. The applications 1106 can also include a client 1142 that provides at least the capability of discovery, play and store of multimedia content, for example, music.

Mobile handset 1100, as indicated above relates to the communications component 1110, includes an indoor network radio transceiver 1111B (e.g., Wi-Fi transceiver). This function supports the indoor radio link, such as IEEE 802.11 (a, b, g, n, . . . ), and other 802.xx protocols (e.g., BlueTooth, Zigbee, . . . ) in the event mobile handset 1100 comprises a dual-mode handset. Mobile handset 1100 can accommodate at least satellite radio services through a handset that can combine wireless voice and digital radio chipsets into a single handheld device.

Figure 12:
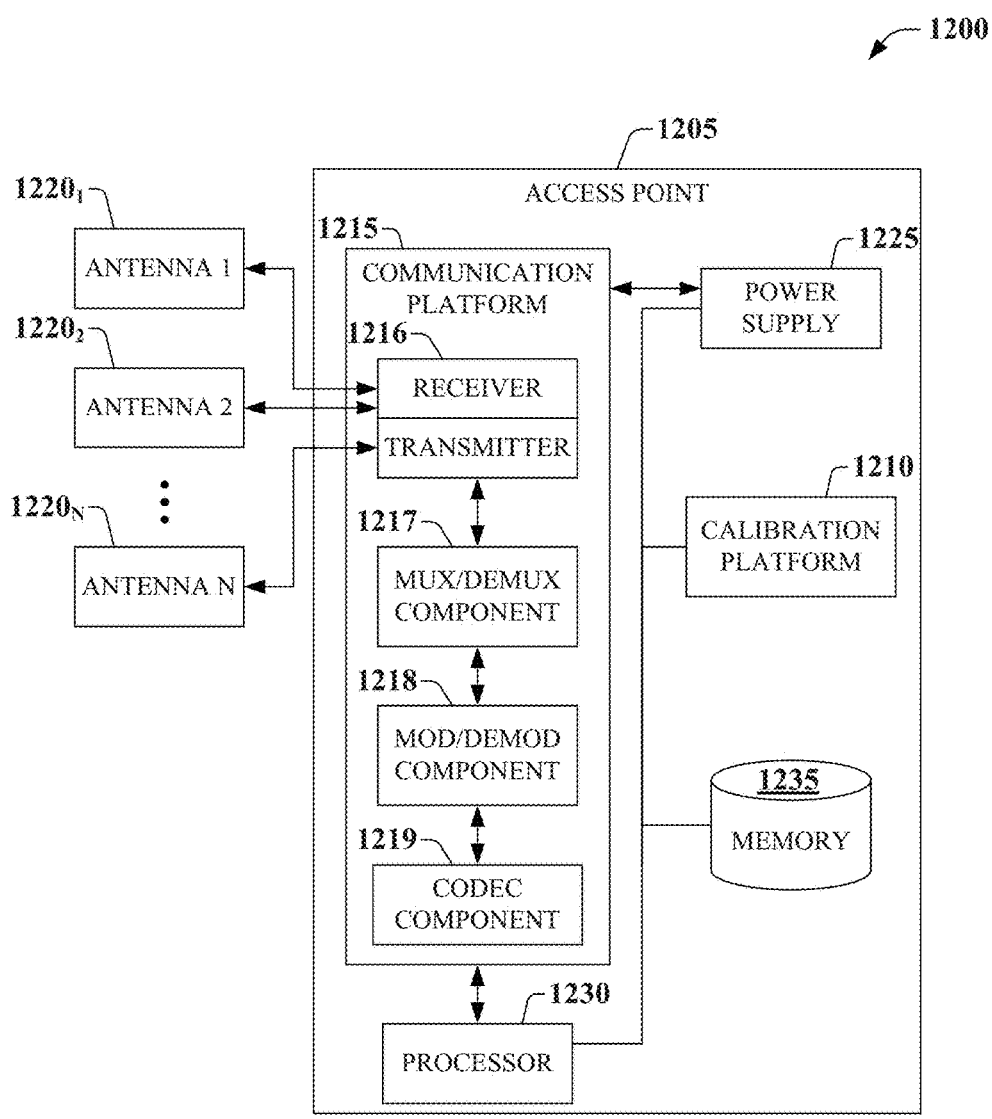
FIG. 12 illustrates a block diagram of a sample wireless communication network that can be operable for facilitating one or more disclosed aspects.

FIG. 12 illustrates a block diagram of an example embodiment of an access point (AP 1205) to implement and exploit one or more features or aspects of the disclosed subject matter. In embodiment 1200, AP 1205 can receive and transmit signal(s) (e.g., attachment signaling) from and to wireless devices like Femto access points, access terminals, wireless ports and routers, wireless handsets, or the like, through a set of antennas $1220_1$-$1020_N$ (N is a positive integer). It should be appreciated that antennas $1220_1$-$1020_N$ can embody macro base stations 206, 302, 604A-604C, which can be a part of communication platform 1215, which comprises electronic components and associated circuitry that provides for processing and manipulation of received signal(s) and signal(s) to be transmitted. In an aspect, communication platform 1215 includes a receiver/transmitter 1216 that can convert wireless signals from analog to digital upon reception, and from digital to analog upon transmission. In addition, receiver/transmitter 1216 can divide a single data stream into multiple, parallel data streams, or perform a reciprocal operation. Coupled to receiver/transmitter 1216 is a multiplexer/demultiplexer 1217 that facilitates manipulation of signal in time and frequency space. Electronic component 1217 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), . . . . In addition, multiplexer/demultiplexer component 1217 can scramble and spread information (e.g., codes) according to substantially any code known in the art; e.g., Hadamard-Walsh codes, Baker codes, Kasami codes, polyphase codes, and so on. A modulator/demodulator 1218 is also a part of communication platform 1215, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1215 can also include a coder/decoder (codec) component 1219 that facilitates decoding received signal(s), and coding signal(s) to convey.

Access point 1205 also includes a processor 1235 configured to confer functionality, at least in part, to substantially any electronic component in AP 1205. In particular, processor 1235 can facilitate determination of propagation delay information of RF signal, or microwave signal, among communication platform 1215 and antennas $1220_1$-$1020_N$ to facilitate estimating a position of a mobile device in accordance with various aspects and embodiments disclosed herein. Power supply 1225 can attach to a power grid and include one or more transformers to achieve power level that can operate AP 1205 components and circuitry. Additionally, power supply 1225 can include a rechargeable power component to ensure operation when AP 1205 is disconnected from the power grid, or in instances, the power grid is not operating.

Processor 1235 can also be functionally connected to communication platform 1215 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1235 can be functionally connected, via a data or system bus, to calibration platform 1212 and other components (not shown) to confer, at least in part functionality to each of such components.

In AP 1205, memory 1245 can store data structures, code instructions and program modules, system or device information, code sequences for scrambling, spreading and pilot transmission, location intelligence storage, determined delay offset(s), over-the-air propagation models, and so on. Processor 1235 is coupled to the memory 1245 in order to store and retrieve information necessary to operate and/or confer functionality to communication platform 1215, calibration platform 1212, and other components (not shown) of access point 1205.

Figure 13:
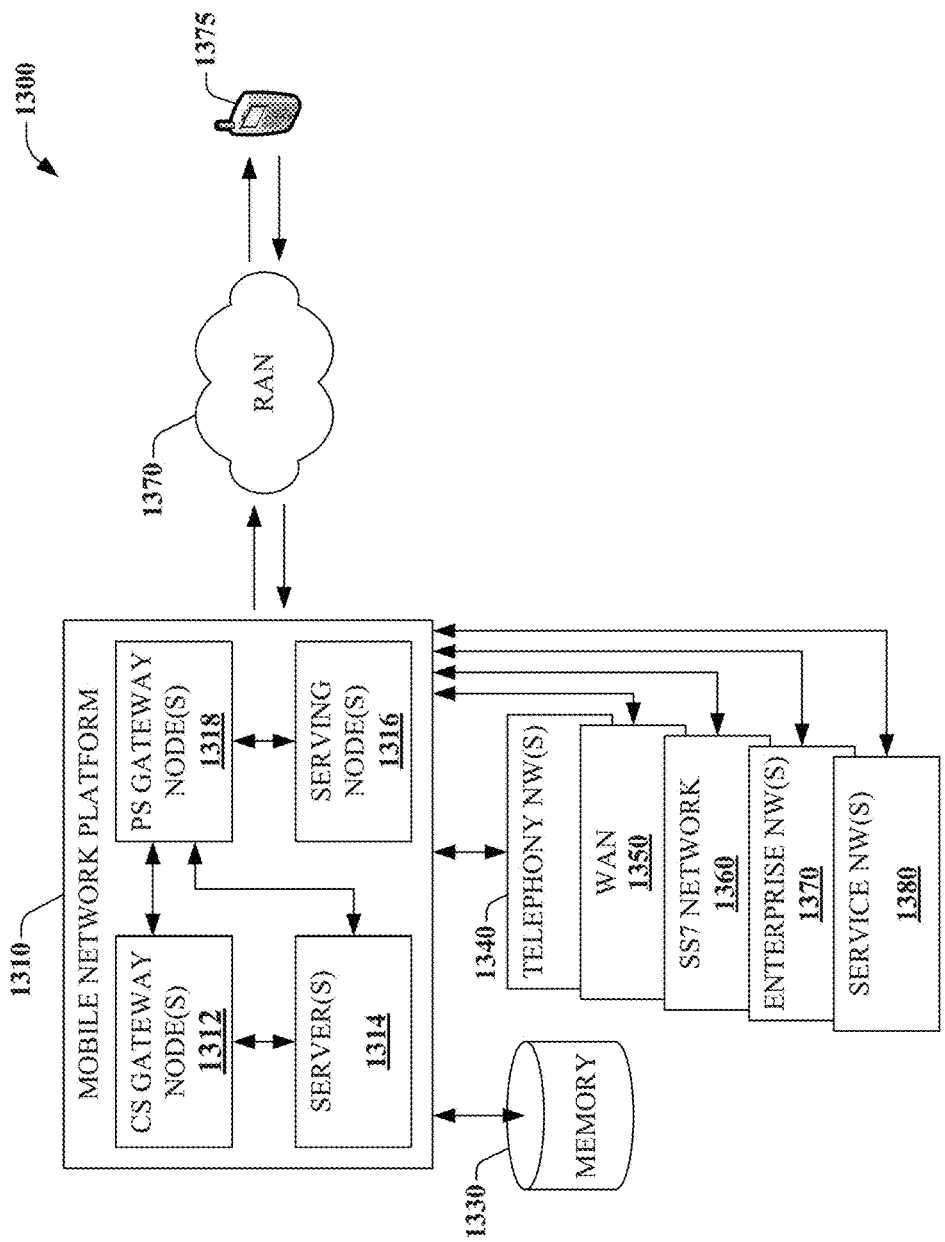
FIG. 13 depicts a block diagram of an example electronic computer device that can be implemented in conjunction with still other disclosed aspects.

FIG. 13 presents an example embodiment 1300 of a mobile network platform 1310 that can implement and exploit one or more aspects of the disclosed subject matter described herein. For instance, mobile network platform 1310 can be utilized by, or at least in part subsumed within, network 402 of FIG. 4. In another aspect, mobile network(s) 104 or 502 can include, in whole or in part, mobile network platform 1310. In yet other aspects, mobile network platform 1310 can control or provide network functionality for WiFi AP 204, 608A, 608B or 608C, or for macro base station 206, 304, 604A, 604B or 604C, or a suitable combination thereof.

Generally, mobile network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In the disclosed subject matter, in addition to receiving and processing CS-switched traffic and signaling, PS gateway node(s) 1318 can authorize and authenticate PS-based data sessions with served mobile devices. Data sessions can include traffic, or content(s), exchanged with networks external to the mobile network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, mobile network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in mobile network platform 1310 can execute numerous applications (e.g., location services, wireless device management, identifying nearby WiFi access points, providing IP session persistence services for suitable mobile devices, . . . ) that can generate multiple disparate packetized data streams or flows, and manage (e.g., schedule, queue, format, duplicate, direct, . . . ) such flows. Such application(s) can include add-on features to standard services (for example, provisioning, billing, customer support . . . ) provided by mobile network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through mobile network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to mobile network platform 1310 (e.g., deployed and operated by the same service provider), such as Femto cell network(s) or Wi-Fi network(s) (not shown) that enhance wireless service coverage within indoor or confined spaces and offload or share RAN resources in order to enhance subscriber service experience within a home or business environment.

It is to be noted that server(s) 1314 can include one or more processors configured to confer at least in part the functionality of macro network platform 1310. To that end, the one or more processors can execute code instructions stored in memory 1330, for example.

In example embodiment 1300, memory 1330 can store information related to operation of mobile network platform 1310. In particular, memory 1330 can include contents of network database 506 in example system 500. Other operational information can include provisioning information of mobile devices served through wireless platform network 1310, subscriber databases; application intelligence, pricing schemes, e.g., promotional rates, flat-rate programs, subscription services which can include an IP session persistence service; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370.

It is to be noted that aspects, and features of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide aspects of the disclosed subject matter. It is, of course, not possible to describe every conceivable combination of components or methodologies for purposes of describing the disclosed subject matter, but one of ordinary skill in the art may recognize that many further combinations and permutations of the subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor;
    a communication interface; and
    a memory that stores executable instructions that, when executed by the processor, facilitate performance of operations, comprising:
        determining a geographic position of a mobile device;
        comparing the geographic position of the mobile device to respective stored geographic positions for which network signal performance of wireless base station equipment of a mobile network has been determined to satisfy a condition defined by a first performance function;
        estimating signal performance of the mobile device in response to the comparing the position of the mobile device with the respective stored geographic positions;
        determining whether the mobile device satisfies a geographic condition with respect to one of the respective stored geographic positions;
        identifying an alternate network access point device, external to the wireless base station equipment, suitable to serve the mobile device;
        determining whether the alternate network access point device satisfies a second condition defined by a second performance function; and
        transmitting a command via the communication interface to a network device of the wireless base station equipment of the mobile network to cause content to be duplicated into a first content stream and a second content stream, to cause a first transmission of the first content stream to the mobile device via the network device concurrent with a second transmission of the second content stream to the mobile device via the alternate network access point device, wherein the transmitting the command is at least in response to the mobile device being determined to satisfy the geographic condition.

2. The system of claim 1, wherein the transmitting the command is further in response to the alternate network access point device being determined to satisfy the second condition.

3. The system of claim 1, wherein the geographic condition is a geographic distance between the geographic position of the mobile device and one of the respective stored geographic positions.

4. The system of claim 1, wherein the operations further comprise monitoring changes in position of the mobile device.

5. The system of claim 4, wherein the operations further comprise estimating a direction of movement of the mobile device in response to monitoring the changes in position of the mobile device.

6. The system of claim 5, wherein the operations further comprise anticipating a future position of the mobile device relative to a subset of the respective stored geographic positions.

7. The system of claim 6, wherein transmitting the command is in response to the future position of the mobile device being determined to satisfy the geographic condition with respect to one of the respective stored geographic positions.

8. The system of claim 6, wherein the operations further comprise transmitting a second command via the communication interface to the mobile network to cause termination of the content being duplicated into the first content stream and the second content stream.

9. The system of claim 8, wherein transmitting the second command is in response to determining the future position satisfies a second geographic condition with respect to the subset of the respective stored geographic positions.

10. The system of claim 1, wherein the operations further comprise directing a source of the content to:
    generate a set of sequencing numbers for the content;
    include one sequencing number of the set of sequencing numbers in respective data packets of the first content stream; and
    include matching sequencing numbers of the set of sequencing numbers in respective data packets of the second content stream, the respective data packets of the second content stream being copies of the respective data packets of the first content stream.

11. The system of claim 1, wherein the condition defined by the first performance function includes a poor network quality condition for a stored geographic position of the stored geographic positions.

12. The system of claim 1, wherein the operations further comprise obtaining a signal metric from the mobile device, and wherein estimating the signal performance of the mobile device utilizes the signal metric obtained from the mobile device.

13. A method, comprising:
    estimating, by a system comprising a processor, signal performance of a mobile device based on a position of the mobile device relative to a set of stored locations for which network signal performance of wireless base station equipment of a mobile network satisfies a condition defined by a first performance function;
    identifying, by the system, an alternate network access point device, external to the wireless base station equipment, suitable for serving the mobile device; and
    transmitting, by the system, a command to cause content to be duplicated and transmitted to the mobile device via the alternate network access point device and a network base station device of the wireless base station equipment of the mobile network concurrently, in response to the mobile device nearing one of the set of stored locations and in response to the alternate network access point device satisfying a condition defined by a second performance function.

14. The method of claim 13, further comprising monitoring, by the system, changes in position of the mobile device.

15. The method of claim 14, further comprising estimating, by the system, a direction of movement of the mobile device from the changes in position.

16. The method of claim 15, further comprising anticipating, by the system, a future position of the mobile device relative to a subset of the set of stored locations in response to monitoring the changes in position and estimating the direction of movement.

17. The method of claim 16, further comprising transmitting, by the system, a second command over the interface to cause termination of duplication of the content, in response to the future position satisfying a geographic condition with respect to the subset of the set of stored locations.

18. The method of claim 16, further comprising maintaining, by the system, the duplication of the content, in response to the future position not satisfying a geographic condition with respect to the subset of the set of stored locations.

19. A system, comprising:
a processor; and
a memory that stores executable instructions that, when executed by the processor, facilitate performance of operations, comprising:
estimating signal performance of a mobile device based on position of the mobile device relative to a set of stored locations for which network signal performance of wireless base station equipment of a mobile network satisfies a condition defined by a first performance function;
identifying an alternate network access point device, external to the wireless base station equipment, able to serve the mobile device; and
transmitting a command to a network device to cause content to be duplicated and transmitted to the mobile device via the alternate network access point device and a base station device of the wireless base station equipment of the mobile network concurrently, in response to the mobile device being determined to be nearing one of the set of stored locations and in response to the alternate network access point device being determined to satisfy a second condition defined by a second performance function.

20. The system of claim 19, wherein the operations further comprise:
monitoring changes in position of the mobile device;
estimating a direction of movement of the mobile device;
predicting a future position of the mobile device relative to a subset of the set of stored locations; and
terminating duplication of the content based on a comparison of the future position with the subset of the set of stored locations.

* * * * *